(12) United States Patent
Shin et al.

(10) Patent No.: US 11,735,774 B2
(45) Date of Patent: Aug. 22, 2023

(54) MULTIFUNCTIONAL ELECTROLYTES FOR RECHARGEABLE LITHIUM-ION BATTERIES

(71) Applicant: Apple Inc., Cupertino, CA (US)

(72) Inventors: Woo Cheol Shin, San Jose, CA (US); Aaron Smith, San Jose, CA (US); Sang Young Yoon, San Jose, CA (US)

(73) Assignee: APPLE INC., Cupertino, CA (US)

(*) Notice: Subject to any disclaimer, the term of this patent is extended or adjusted under 35 U.S.C. 154(b) by 184 days.

(21) Appl. No.: 17/242,381

(22) Filed: Apr. 28, 2021

(65) Prior Publication Data
US 2022/0352553 A1 Nov. 3, 2022

(51) Int. Cl.
*H01M 10/0568* (2010.01)
*H01M 10/0525* (2010.01)
*H01M 10/0569* (2010.01)
*H01M 10/0567* (2010.01)
*H01M 4/525* (2010.01)
*H01M 4/583* (2010.01)

(52) U.S. Cl.
CPC ....... *H01M 10/0568* (2013.01); *H01M 4/525* (2013.01); *H01M 4/583* (2013.01); *H01M 10/0525* (2013.01); *H01M 10/0567* (2013.01); *H01M 10/0569* (2013.01); *H01M 2300/0037* (2013.01)

(58) Field of Classification Search
None
See application file for complete search history.

(56) References Cited

U.S. PATENT DOCUMENTS

| 9,077,046 | B2 | 7/2015 | Tikhonov et al. | |
|---|---|---|---|---|
| 10,305,144 | B2 | 5/2019 | Hwang et al. | |
| 2016/0226103 | A1* | 8/2016 | Teran | H01M 10/0567 |
| 2018/0301758 | A1 | 10/2018 | Abe et al. | |
| 2019/0074547 | A1 | 3/2019 | Rhodes et al. | |
| 2019/0326641 | A1* | 10/2019 | Dou | H01M 10/0567 |
| 2020/0235432 | A1 | 7/2020 | Okamoto | |
| 2022/0093970 | A1* | 3/2022 | Goh | H01M 50/417 |

FOREIGN PATENT DOCUMENTS

| WO | 2020000888 A1 | | 1/2020 |
|---|---|---|---|
| WO | WO2020162659 | * | 8/2020 |
| WO | 2020238302 A1 | | 12/2020 |
| WO | 2020244260 A1 | | 12/2020 |

OTHER PUBLICATIONS

Liu, J., et al., "Fluorinated phosphazene derivative—A promising electrolyte additive for high voltage lithium ion batteries: From electrochemical performance to corrosion mechanism", Nano Energy 46 (2018), 404-414 (11 pp).

Li, X., et al., "Ethoxy (pentafluoro) cyclotriphosphazene (PFPN) as a multi-functional flame retardant electrolyte additive for lithium-ion batteries", Journal of Power Sources 378 (2018) 707-716 (10 pp).

* cited by examiner

*Primary Examiner* — Christopher P Domone
(74) *Attorney, Agent, or Firm* — Young Basile Hanlon & MacFarlane, P.C.

(57) ABSTRACT

An electrolyte for a rechargeable lithium-ion battery includes a solvent consisting of 10.0 wt. % to 35.0 wt. % carbonate-based solvent and 50.0 wt. % to 80.0 wt. % propionate-based solvent, 1.1M to 1.3M lithium salt, 0.1 wt. % to 12.0 wt. % of a phosphazene-based flame retardant, 1,3,6-hexanetricarbonitrile and succinonitrile together in a range of 0.1 wt. % to 5.0 wt. %, and 1.7 wt. % to 15.0 wt. % additives.

20 Claims, 1 Drawing Sheet

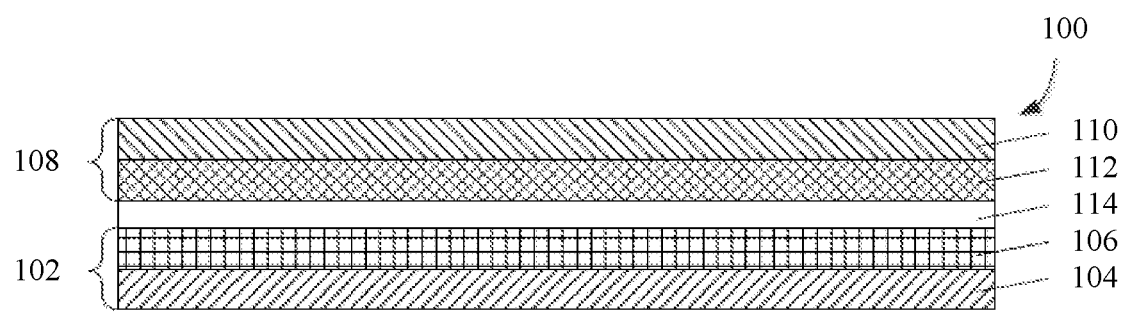

MULTIFUNCTIONAL ELECTROLYTES FOR RECHARGEABLE LITHIUM-ION BATTERIES

TECHNICAL FIELD

This disclosure relates to multifunctional electrolytes for rechargeable lithium-ion batteries using a propionate-based solvent with a flame retardant and nitrile-based additives.

BACKGROUND

Lithium-ion batteries are rechargeable electrochemical devices where both the anode and cathode active materials are intercalation materials, and the electrolyte is commonly a lithium salt dissolved in carbonate solvents. Lithium-ion batteries with traditional electrolytes often cannot meet the safety requirements and power density requirements of today's commercial applications.

The electrolyte determines, at least in part, the power density, the time stability, and the safety of the lithium-ion battery, as the electrolyte is in close interaction with all of the other battery components, including the cathode active material, the anode active material, and the separator. In addition, chemical stability requirements at the interface of the electrolyte and each of the anode active material and the cathode active material limit the materials that can be used in the lithium-ion battery. The solid electrolyte interface (SEI) formed at the interfaces promotes chemical compatibility. The formation and properties of the SEI depend on both the electrolyte and the active materials used. Furthermore, conventional electrolytes with carbonate solvents have low voltage stability.

A means of achieving higher energy and power density includes increasing the capacity and the voltage of lithium-ion batteries. Multifunctional electrolytes with high voltage and high temperature stability, which promote chemical compatibility, and that are safe across the operational ranges of lithium-ion batteries are needed.

SUMMARY

Disclosed herein are implementations of a multifunctional electrolyte for rechargeable lithium-ion batteries, lithium-ion battery cells comprising the multifunctional electrolyte and lithium-ion batteries comprising multiple lithium-ion battery cells.

A multifunctional electrolyte for a rechargeable lithium-ion battery as disclosed herein includes a solvent consisting of 10.0 wt. % to 35.0 wt. % carbonate-based solvent and 50.0 wt. % to 80.0 wt. % propionate-based solvent, 1.1M to 1.3M lithium salt, 0.1 wt. % to 12.0 wt. % of a phosphazene-based flame retardant, 1,3,6-hexanetricarbonitrile and succinonitrile together in a range of 0.1 wt. % to 5.0 wt. %, and 1.7 wt. % to 15.0 wt. % additives.

The propionate-based solvent of the electrolyte can be a combination of ethylene propionate and propylene propionate. For example, the ethylene propionate can be 10.0 vol. % to 25.0 vol. % of the total solvent volume and the propylene propionate can be 40.0 vol. % to 55.0 vol. % of the total solvent volume.

The carbonate-based solvent of the electrolyte can be a combination of ethylene carbonate and propylene carbonate. For example, the ethylene carbonate can be 10.0 vol. % to 25.0 vol. % of the total solvent volume and the propylene carbonate can be 5.0 vol. % to 17.5 vol. % of the total solvent volume.

The additives can comprise one or more of vinyl ethylene carbonate, propane sultone, fluoroethylene carbonate, and lithium difluoro(oxalate) borate. For example, the additives can comprise 0.1 wt. % to 1.0 wt. % vinyl ethylene carbonate, 0.5 wt. % to 5.0 wt. % propane sultone, 1.0 wt. % to 8.0 wt. % fluoroethylene carbonate, and 0.1 wt. % to 1.0 wt. % lithium difluoro(oxalate) borate.

A lithium-ion battery cell has an anode comprising anode active material; a cathode comprising cathode active material; and a multifunctional electrolyte as disclosed herein. The anode active material can comprise graphite and the cathode active material can comprise $LiCoO_2$.

The lithium-ion battery cell and batteries formed thereof have a maximum voltage of greater than 4.40V and an operating temperature of −20° C. to 85° C.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 1 is a cross-sectional view of a lithium-ion battery cell comprising the multifunctional electrolyte as disclosed herein.

DETAILED DESCRIPTION

Multifunctional electrolytes for rechargeable lithium-ion batteries using a propionate-based solvent with a flame retardant and nitrile-based additives are disclosed herein. The multifunctional electrolytes enable cell operation over a wide temperature range, improve the stability and lifetime of the batteries, and have improved high voltage stability, enabling battery operation over 4.4V.

A multifunctional electrolyte for a rechargeable lithium-ion battery as disclosed herein includes a solvent consisting of 10.0 wt. % to 35.0 wt. % carbonate-based solvent and 50.0 wt. % to 80.0 wt. % propionate-based solvent, 1.1M to 1.3M lithium salt, 0.1 wt. % to 12.0 wt. % of a phosphazene-based flame retardant, 1,3,6-hexanetricarbonitrile and succinonitrile together in a range of 0.1 wt. % to 5.0 wt. %, and 1.7 wt. % to 15.0 wt. % additives.

The multifunctional electrolyte formulation, particularly when used with cobalt based cathode active material, such as $LiCoO_2$, and graphite anode active material, enable cell operation over an operating temperature range of −20° C. to 85° C., has improved high voltage stability, enabling battery operation over 4.4V, and in particular over 4.55 V. The combination of solvents, flame retardant and nitrile-based components improves the safety, stability and lifetime of the batteries.

The multifunctional electrolyte includes a solvent consisting of 10.0 wt. % to 35.0 wt. % carbonate-based solvent and 50.0 wt. % to 80.0 wt. % propionate-based solvent. The inclusion of the carbonate-based solvent keeps the electrolyte viscosity low and the electrolyte conductivity high. The inclusion of the propionate-based solvent provides superior anode impregnation, or wetting, compared to carbonate-based solvents alone. The propionate-based solvent also has better anodic stability, or a higher oxidation potential, on the cathode surface compared to carbonate-based solvents alone.

The propionate-based solvent of the electrolyte can be a combination of ethylene propionate and propylene propionate. For example, the ethylene propionate can be 10.0 vol. % to 25.0 vol. % of the total solvent volume and the propylene propionate can be 40.0 vol. % to 55.0 vol. % of the total solvent volume. More particularly, the ethylene propionate can be 20.0 vol. % to 25.0 vol. % of the total solvent volume and the propylene propionate can be 40.0 vol. % to 45.0 vol. % of the total solvent volume. Even more particularly, the ethylene propionate can be 25.0 vol. % of the total solvent volume and the propylene propionate can be 45.0 vol. % of the total solvent volume.

The carbonate-based solvent of the electrolyte can be a combination of ethylene carbonate and propylene carbonate. For example, the ethylene carbonate can be 10.0 vol. % to 25.0 vol. % of the total solvent volume and the propylene carbonate can be 5.0 vol. % to 17.5 vol. % of the total solvent volume. More particularly, the ethylene carbonate can be 20.0 vol. % to 25.0 vol. % of the total solvent volume and the propylene carbonate can be 8.0 vol. % to 10.0 vol. % of the total solvent volume. Even more particularly, the ethylene carbonate can be 20.0 vol. % of the total solvent volume and the propylene carbonate can be 10.0 vol. % of the total solvent volume. The volume of propylene propionate is greater than the volume of each of the ethylene propionate, the ethylene carbonate and the propylene carbonate.

The multifunctional electrolyte contains 1.1M to 1.3M lithium salt. The lithium salt is not particularly limited and should be completely soluble in the solvent. Non-limiting examples of the lithium salt include $LiPF_6$, LiFSI and LiTFSI, or combinations thereof.

The multifunctional electrolyte contains 0.1 wt. % to 12.0 wt. % of a phosphazene-based flame retardant. Examples of phosphazene-based flame retardants include, but are not limited to, monoethoxypentafluorocyclotriphosphazene, methoxypentafluorocyclotriphosphazene, ethoxypentafluorocyclotriphosphazene, phenoxypentafluorocyclotriphosphazene, and ethoxyheptafluorocyclotetraphosphazene.

The multifunctional electrolyte includes 1,3,6-hexanetricarbonitrile (HTCN) and succinonitrile (SN) together in a range of 0.1 wt. % to 5.0 wt. % in total as a cathode additive. In particular, the electrolyte can include 2.0 wt. % SN and 3.0 wt. % HTCN. Oxidation of the electrolyte solvent can result in unwanted gases. Oxidization of the electrolyte solvent is also a cause of poor cycling performance of high-voltage cathodes, resulting in continued growth of the SEI on the cathode. This growth of SEI leads to an increase in the electrode impedance over cycling. The cycling performance, coulombic efficiency, and rate capability of the cathode are dependent on the SEI. The addition of SN in combination with HTCN can reduce the reversible capacity loss and gas generation during storage. The combination of SN and HTCN forms a thin, uniform SEI layer on $LiCoO_2$ cathode active material, resulting in a cell with good cyclability at high voltages over 4.4V.

Rounding out the multifunctional electrolyte are other additives, some or all of which are anode additives. On the anode side, capacity fade over long-term cycling can result from continual growth of the SEI layer at the graphite anode active material through electrolyte reduction reactions that immobilize lithium ions. The additives selected improve the properties of the SEI layer on the electrodes' surfaces, increase the ionic conductivity of the electrolyte, increase the thermal stability of the lithium salt, and improve the low temperature performance of graphite anodes, among other benefits. The additives can comprise one or more of vinyl ethylene carbonate, propane sultone, fluoroethylene carbonate, and lithium difluoro(oxalate) borate. For example, the additives can comprise 0.1 wt. % to 1.0 wt. % vinyl ethylene carbonate, 0.5 wt. % to 5.0 wt. % propane sultone, 1.0 wt. % to 8.0 wt. % fluoroethylene carbonate, and 0.1 wt. % to 1.0 wt. % lithium difluoro(oxalate) borate. In an implementation, all the listed additives are used. In an implementation, only the listed additives are used.

One approach to boost the energy and power densities of the lithium-ion battery is to increase the output voltage while maintaining capacity and charge-discharge rates. However, not all cathode active materials can stand up to the increased voltage. For example, $LiCoO_2$ typically delivers only a portion of its theoretical capacity under normal operations. However, increasing the voltage can lead to increased capacity fade and limited cycle life due to degradation of the $LiCoO_2$. The formulation of the multifunctional electrolytes disclosed herein can be used with $LiCoO_2$ cathode active material at maximum voltages of greater than 4.4V, and in particular over 4.55 V. The multifunctional electrolytes can also be used with other cobalt-based cathode materials and other transition metal-based cathode materials.

The combination of the components of the multifunctional electrolyte provides superior performance, particularly with cobalt-based cathodes materials such as $LiCoO_2$, the combination including the specific components and the concentrations. One example of a multifunctional electrolyte for a rechargeable lithium-ion battery was formulated as follows: 1.2M $LiPF_6$; solvent consisting of 20.0 vol. % ethylene carbonate, 10.0 vol. % propylene carbonate, 45.0 vol. % propylene propionate, and 25.0 vol. % ethylene propionate; 2.0 wt. % SN; 3.0 wt. % HTCN; 0.5 wt. % vinyl ethylene carbonate; 4.0 wt. % propane sultone; 7.0 wt. % fluoroethylene carbonate; 0.5 wt. % lithium difluoro(oxalate) borate, and 4.0 wt. % monoethoxypentafluorocyclotriphosphazene. The multifunctional electrolyte was tested in a cell using $LiCoO_2$ as the cathode active material and graphite as the anode active material, the performance compared to a battery cell with the same active materials and the electrolyte formulation of the example without the phosphazene-based flame retardant. The cell with the multifunctional electrolyte formulation had improved impact test rates, tested at a maximum voltage of 4.45V and 4.48V. The cell with the multifunction electrolyte formulation showed improved float charge tests after 1000 hours, including a reduced change in cell thickness and swelling rate. Coulombic efficiencies also improved at 25° C. and 45° C.

The same multifunctional electrolyte with the formulation described above was tested against formulations with 1) 2.0 wt. % SN and 3.5 wt. % HTCN (5.5 wt. % total) and 2) 3.0 wt. % SN and 4.0 wt. % HTCN (7.0 wt. % total). The formulations 1) and 2), with a total amount of SN and HTCN over 5.0 wt. %, showed higher initial cell impedance at 25° C. and 45° C. as well as increased growth rate at 500 cycles and a maximum voltage of 4.47V. See Table 1 below.

TABLE 1

| Electrolyte | Multifunctional electrolyte | Comparative electrolyte 1 | Comparative electrolyte 2 |
| --- | --- | --- | --- |
| 15 min Rss @25° C., cycle 1, 20% SOC, Ohms | 98 | 97 | 114 |
| 15 min Rss @25° C., cycle 500, 20% SOC, Ohms | 126 | 128 | 147 |
| 25° C. Rss growth (cycle 500 vs. 1) | 28.6% | 32.0% | 28.9% |
| 15 min Rss @45° C., cycle 1, 20% SOC, Ohms | 60 | 57 | 60 |
| 15 min Rss @45° C., cycle 500, 20% SOC, Ohms | 81 | 86 | 87 |
| 45° C. Rss growth (cycle 500 vs. 1) | 35.0% | 50.9% | 45.0% |

An aspect of the disclosed embodiments is a lithium-ion battery. The power generating element of the lithium-ion battery includes a plurality of unit lithium-ion battery cell layers each including a cathode active material layer, an electrolyte having the multifunctional electrolyte disclosed herein, and an anode active material layer. The cathode active material layer is formed on a cathode current collector and electrically connected thereto, and the anode active material layer is formed on an anode current collector and electrically connected thereto. A separator is positioned between the anode active material and the cathode active material.

A lithium-ion battery cell 100 is shown in cross-section in FIG. 1. The lithium-ion battery cell 100 has an anode 102 with an anode current collector 104 and an anode active material 106 disposed on the anode current collector 104. The lithium-ion battery cell 100 also has a cathode 108 with a cathode current collector 110 and a cathode active material 112 disposed over the cathode current collector 110. The cathode 108 and the anode 102 are separated by a separator 114, if needed, and the multifunctional electrolyte as disclosed herein.

The cathode current collector 110 can be, for example, an aluminum sheet or foil. Cathode active materials 112 are those that can occlude and release lithium ions, and can include one or more oxides, chalcogenides, and lithium transition metal oxides which can be bonded together using binders and optionally conductive fillers such as carbon black. Lithium transition metal oxides can include, but are not limited to, $LiCoO_2$, $LiNiO_2$, $LiNi_{0.8}Co_{0.15}Al_{0.05}O_2$, $LiMnO_2$, $Li(Ni_{0.5}Mn_{0.5})O_2$, $LiNi_xCo_yMn_zO_2$, Spinel $Li_2Mn_2O_4$, $LiFePO_4$ and other polyanion compounds, and other olivine structures including $LiMnPO_4$, $LiCoPO_4$, $LiNi_{0.5}Co_{0.5}PO_4$, and $LiMn_{0.33}Fe_{0.33}Co_{0.33}PO_4$. As needed, the cathode active material 112 can contain an electroconductive material, a binder, etc.

The anode active material 106 is graphite. A conducting agent may be used. Further, one or more of a binder and a solvent may be used to prepare a slurry that is applied to the current collector, for example. The anode current collector 104 can be a copper or nickel sheet or foil, as a non-limiting example.

It is to be understood that the terminology used herein is used for the purpose of describing particular implementations only and is not intended to limit the scope of the disclosure. It must be noted that as used herein and in the appended claims, the singular forms "a," "an," and "the" include the plural reference unless the context clearly dictates otherwise. Thus, for example, a reference to "an element" is a reference to one or more elements, and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise. Unless defined otherwise, all technical and scientific terms used herein have the same meanings as commonly understood by one of ordinary skill in the art to which this invention belongs.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A lithium-ion battery cell, comprising:
   an anode comprising anode active material;
   a cathode comprising cathode active material; and
   an electrolyte consisting of:
   10.0 wt. % to 35.0 wt. % carbonate-based solvent;
   50.0 wt. % to 80.0 wt. % propionate-based solvent;
   1.1M to 1.3M lithium salt;
   0.1 wt. % to 12.0 wt. % of a phosphazene-based flame retardant; and
   1.8 wt. % to 20.0 wt. % additives, wherein the additives comprise 1,3,6-hexanetricarbonitrile and succinonitrile together in a range of 0.1 wt. % to 5.0 wt. %, with remaining additives being anode additives.

2. The lithium-ion battery cell of claim 1, wherein the propionate-based solvent is a combination of ethylene propionate and propylene propionate.

3. The lithium-ion battery cell of claim 2, wherein the propylene propionate is 40.0 vol. % to 55.0 vol. % of a total solvent volume and the ethylene propionate is 10.0 vol. % to 25.0 vol. % of the total solvent volume.

4. The lithium-ion battery cell of claim 2, wherein the propylene propionate is 40.0 vol. % to 45.0 vol. % of a total solvent volume and the ethylene propionate is 20.0 vol. % to 25.0 vol. % of the total solvent volume.

5. The lithium-ion battery cell of claim 1, wherein the carbonate-based solvent is a combination of ethylene carbonate and propylene carbonate.

6. The lithium-ion battery cell of claim 5, wherein the ethylene carbonate is 10.0 vol. % to 25.0 vol. % of a total solvent volume and the propylene carbonate is 5.0 vol. % to 17.5 vol. % of the total solvent volume.

7. The lithium-ion battery cell of claim 5, wherein the ethylene carbonate is 20.0 vol. % to 25.0 vol. % of a total solvent volume and the propylene carbonate is 10.0 vol. % of the total solvent volume.

8. The lithium-ion battery cell of claim 1, wherein the anode active material comprises graphite and the cathode active material comprises $LiCoO_2$.

9. The lithium-ion battery cell of claim 8, having a maximum voltage of greater than 4.40V.

10. The lithium-ion battery cell of claim 8, having an operating temperature of −20° C. to 85° C.

11. An electrolyte for a rechargeable lithium-ion battery, consisting of:
10.0 wt. % to 35.0 wt. % carbonate-based solvent;
50.0 wt. % to 80.0 wt. % propionate-based solvent;
1.1M to 1.3M lithium salt;
0.1 wt. % to 12.0 wt. % of a phosphazene-based flame retardant;
1,3,6-hexanetricarbonitrile and succinonitrile together in a range of 0.1 wt. % to 5.0 wt. %; and
1.7 wt. % to 15.0 wt. % additives selected from the group consisting of vinyl ethylene carbonate, propane sultone, fluoroethylene carbonate, and lithium difluoro(oxalate) borate.

12. The electrolyte of claim 11, wherein the propionate-based solvent is a combination of ethylene propionate and propylene propionate.

13. The electrolyte of claim 12, wherein the propylene propionate is 40.0 vol. % to 55.0 vol. % of a total solvent volume and the ethylene propionate is 10.0 vol. % to 25.0 vol. % of the total solvent volume.

14. The electrolyte of claim 11, wherein the carbonate-based solvent is a combination of ethylene carbonate and propylene carbonate.

15. The electrolyte of claim 14, wherein the ethylene carbonate is 10.0 vol. % to 25.0 vol. % of a total solvent volume and the propylene carbonate is 5.0 vol. % to 17.5 vol. % of the total solvent volume.

16. The electrolyte of claim 1, wherein the additives comprise one or more of vinyl ethylene carbonate, propane sultone, fluoroethylene carbonate, and lithium difluoro(oxalate) borate.

17. The electrolyte of claim 11, wherein the additives are 0.1 wt. % to 1.0 wt. % vinyl ethylene carbonate, 0.5 wt. % to 5.0 wt. % propane sultone, 1.0 wt. % to 8.0 wt. % fluoroethylene carbonate, and 0.1 wt. % to 1.0 wt. % lithium difluoro(oxalate) borate.

18. A lithium-ion battery, comprising:
an anode comprising graphite active material;
a cathode comprising $LiCoO_2$ active material; and
an electrolyte consisting of:
a solvent consisting of a combination of ethylene carbonate, propylene carbonate, ethylene propionate and propylene propionate, the propylene propionate having a volume percent of a total solvent volume greater than each of the ethylene carbonate, the propylene carbonate, the ethylene propionate;
1.1M to 1.3M lithium salt;
0.1 wt. % to 12.0 wt. % of a phosphazene-based flame retardant;
1,3,6-hexanetricarbonitrile and succinonitrile together in a range of 0.1 wt. % to 5.0 wt. %; and
1.7 wt. % to 15.0 wt. % additives, the additives selected from the group consisting of vinyl ethylene carbonate, propane sultone, fluoroethylene carbonate, and lithium difluoro(oxalate) borate.

19. The lithium-ion battery of claim 18, having a maximum voltage of greater than 4.40 V.

20. The lithium-ion battery of claim 18, having an operating temperature of −20° C. to 85° C.

* * * * *